(12) United States Patent
Hein et al.

(10) Patent No.: US 11,752,825 B2
(45) Date of Patent: Sep. 12, 2023

(54) METHOD FOR OPERATING AN AIR SUSPENSION SYSTEM USING A DRYER REGENERATION FUNCTION

(71) Applicant: Continental Teves AG & Co. OHG, Frankfurt am Main (DE)

(72) Inventors: Dierk Hein, Wedemark (DE); Christian Witala, Hannover (DE); Volkan Sirke, Hannover (DE); Holger Oldenettel, Wedemark (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 17/545,278

(22) Filed: Dec. 8, 2021

(65) Prior Publication Data

US 2022/0176767 A1 Jun. 9, 2022

(30) Foreign Application Priority Data

Dec. 8, 2020 (DE) ...................... 10 2020 215 503.8
Feb. 16, 2021 (DE) ...................... 10 2021 201 458.5

(51) Int. Cl.
*B60G 17/015* (2006.01)
*B60G 17/052* (2006.01)

(52) U.S. Cl.
CPC ....... *B60G 17/0155* (2013.01); *B60G 17/052* (2013.01); *B60G 2202/152* (2013.01);
(Continued)

(58) Field of Classification Search
CPC .............. B60G 17/0155; B60G 17/052; B60G 2202/152; B60G 2206/42;
(Continued)

(56) References Cited

U.S. PATENT DOCUMENTS

2004/0188970 A1* 9/2004 Matern ............. B60G 17/0155
280/124.16
2005/0120582 A1 6/2005 Moulding
(Continued)

FOREIGN PATENT DOCUMENTS

CN       102307648 A    1/2012
CN       106457129 A    2/2017
(Continued)

OTHER PUBLICATIONS

Notice of Reasons for Refusal dated Nov. 25, 2022 for the counterpart Japanese Patent Application No. 2021-181943.
(Continued)

*Primary Examiner* — James A English
*Assistant Examiner* — Matthew James O'Neill (57) ABSTRACT

An air suspension system for a motor vehicle and a method of operating thereof includes an air suspension device for adjusting a ride-height position of the motor vehicle by the feeding and removal of compressed air into a plurality of air springs. The system also includes a dryer supplied via a compressed-air supply unit which has a compressor driven by an electric motor. A control unit for performing a ride-height control function has instruction for: raising the ride-height position to a first ride-height position; subsequently lowering the ride-height position to a second ride-height position; checking a first condition whether a determined air quantity ratio is less than a first predetermined air quantity limit value; checking a second condition whether a saturation level of the dryer is greater than a saturation limit value, and activating the ride-height control function when either the first or the second condition is satisfied.

16 Claims, 6 Drawing Sheets

(52) U.S. Cl.
CPC .... *B60G 2206/42* (2013.01); *B60G 2400/252* (2013.01); *B60G 2400/84* (2013.01); *B60G 2500/30* (2013.01); *B60G 2600/182* (2013.01); *B60G 2600/66* (2013.01); *B60G 2800/914* (2013.01)

(58) Field of Classification Search
CPC .......... B60G 2400/252; B60G 2400/84; B60G 2500/30; B60G 2600/182; B60G 2600/66; B60G 2800/914
See application file for complete search history.

(56) References Cited

U.S. PATENT DOCUMENTS

| | | | |
|---|---|---|---|
| 2011/0052419 A1 | 3/2011 | Bordacs | |
| 2011/0278804 A1 | 11/2011 | Folchert et al. | |
| 2013/0318954 A1 | 12/2013 | Frank | |
| 2017/0165605 A1 | 6/2017 | Minato et al. | |
| 2017/0259641 A1* | 9/2017 | Ohashi | B60G 17/0155 |
| 2018/0079273 A1 | 3/2018 | Ito | |
| 2019/0388827 A1 | 12/2019 | Oldenettel | |
| 2021/0394577 A1 | 12/2021 | Uchino | |
| 2022/0032716 A1* | 2/2022 | Akcam | B60G 17/0523 |
| 2022/0032718 A1 | 2/2022 | Kawia et al. | |
| 2022/0227196 A1* | 7/2022 | Meier | B60G 17/0155 |

FOREIGN PATENT DOCUMENTS

| | | |
|---|---|---|
| CN | 107009838 A | 8/2017 |
| DE | 102009003396 A1 | 7/2010 |
| DE | 102012200412 A1 | 7/2013 |
| EP | 1529704 A1 | 5/2005 |
| JP | 2002087040 A | 3/2002 |
| JP | 2012516256 A | 7/2012 |
| JP | 2015105007 A | 6/2015 |
| JP | 2018079711 A | 5/2018 |
| JP | 2018192989 A | 12/2018 |
| WO | 2016034601 A1 | 3/2016 |
| WO | 2020066398 A1 | 4/2020 |
| WO | 2020066774 A1 | 4/2020 |

OTHER PUBLICATIONS

Chinese Office Action dated Apr. 25, 2023 for the counterpart Chinese Patent Application No. 202100516113.3.

* cited by examiner

METHOD FOR OPERATING AN AIR SUSPENSION SYSTEM USING A DRYER REGENERATION FUNCTION

CROSS REFERENCE TO RELATED APPLICATIONS

This U.S. patent application claims the benefit of German patent applications No. 10 2021 201 458.5, filed Feb. 16, 2021 and 10 2020 215 503.8, filed Dec. 8, 2020, which are both hereby incorporated by reference.

TECHNICAL FIELD

The invention relates to a method for operating an electronically controllable air suspension system

BACKGROUND

Electronically controllable air suspension systems for ride-height control of a passenger motor vehicle have been known for some time. The main components of the air suspension system are adjustable air springs, which cushion the vehicle body, and an air supply device, which provides compressed air therefor. These two components are connected to one another via pneumatic lines. Moreover, a wide variety of sensors, such as height and pressure sensors, and a control unit which is functional as a control and evaluation device, are provided. A wide variety of electromagnetic switching valves which are actuated by the control unit are provided in the pneumatic lines. It goes without saying that the sensors and the switching valves are connected to the control unit via electrical lines.

The air suspension system makes it possible to actively change the height/level of the vehicle body in relation to a vehicle axle or the road surface. According to requirement, the air springs are filled or emptied by way of switching of particular valves, in order to adjust the vehicle ride height. In this regard, after the loading of the vehicle for example, ride-height compensation may be carried out, or the vehicle may be lowered during travel to save fuel.

The compressed-air supply device for such an electronically controlled air suspension system comprises substantially a compressor, which is driven via a motor, and a dryer unit, and also multiple switching valves. For the operation of the air suspension system, the compressor sucks in air from the atmosphere, compresses said air and feeds it to the consumers of the air suspension system.

The ambient air sucked in, however, contains water or moisture, which can lead to freezing of individual components, for example the switching valves. To prevent this, the dew point of the air sucked in is lowered by way of the dryer. That is to say, the air is dried or dehumidified by way of a desiccant/adsorbent, for example silica gel. The air sucked in thereby releases the moisture to the desiccant and is subsequently guided into the air springs or into a pressure accumulator.

The task of the dryer is therefore to dry the air sucked into the air suspension system. At and above a certain point, the dryer is to be considered as being saturated because the adsorbent has already taken up a large quantity of moisture and, therefore, can perform its drying function only to a limited extent. The dryer therefore has to be regenerated regularly so that a reliable drying function is ensured.

The regeneration of the dryer is realized by way of desorption. That is to say, the moisture or water contained in the adsorbent is absorbed, and released to the surroundings, by means of air passing through. For this purpose, dry compressed air is taken from the air suspension system. For example, during a lowering process, the compressed air flows through the dryer from the air springs so as to regenerate said dryer. Here, the compressed air flows in a counterflow configuration or in a codirectional-flow configuration through the dryer from the air springs and is discharged to the surroundings via a discharge valve.

In summary, the dryer is operated according to the pressure-swing principle. Firstly, air is sucked in from the surroundings or atmosphere by the compressor and is transferred into the air springs or the pressure accumulator through the dryer. In the process, the desiccant extracts the moisture from the air sucked in. Upon a change in ride height or upon loading compensation, the system air from the air springs or the pressure accumulator is firstly expanded to ambient pressure by means of a throttle and is then guided in a counterflow configuration or in a codirectional-flow configuration through the desiccant. During the discharge of said system air into the surroundings/atmosphere, the moisture is transferred from the desiccant into the air flowing through the dryer, whereby the desiccant loses moisture and the dryer is regenerated.

Leakage in the air suspension system, however, has the effect that the available system air for the regeneration of the dryer is always less than the available quantity of air which was fed into the system from the surroundings. If the proportion of the discharged regeneration air quantity, in relation to the air quantity fed into the system, falls below a limit value, this leads to an accumulation of the moisture in the desiccant. As a result, there is always a risk of a breakthrough of water into the system. That is to say, the quantity of water stored in the desiccant partly or fully exits the dryer and enters the components of the air suspension system. Water thereby accumulates for example at the switching valves, which are particularly susceptible in this case. At low temperatures, the switching valves can freeze and are then no longer functional.

To prevent this, a ride-height control function in the case of which the ride-height position of the motor vehicle is raised beyond a target ride height and the ride-height position is subsequently lowered to the target ride height is performed. This is achieved in that the compressor sucks in more air from the surroundings than would actually be necessary for controlled raising to the target ride height and consequently feeds more air into the system. During the lowering to the target ride height, the compressed air flows through the dryer from the air springs and, in this way, prevents water from accumulating in the desiccant.

However this function loads the compressor to an excessive degree. In order to raise the ride-height position beyond the target ride height, the compressor has to expend more work than would actually be necessary. However, moisture must under no circumstances pass to the switching valves. Therefore, said ride-height control function is in principle always performed whenever a ride-height adjustment or loading compensation is realized. That is to say, said function is also performed if there is no leakage or if the dryer has a low, safe saturation level. This continuous additional feeding power, however, effects the service life of the compressor. The compressor then has to be designed to be overdimensioned, and has to be equipped with more robust components, in order to last the longer service life. This leads in turn to a larger and more expensive compressor.

Document DE 10 2009 003 396 A1 has disclosed a method for controlling the regeneration cycles for a dryer of a closed ride-height control system for vehicles. In this method, during the filling of the ride-height control system, the compressed air quantity and also the ambient temperature and/or the humidity are measured. There is always passed through the dryer such a quantity of compressed air that said dryer is considered as being saturated on the assumption of a maximum possible ambient temperature and/or humidity. Consequently, there is always a sufficient quantity of air available in the ride-height control system for the regeneration of the dryer.

It is desirable to provide an improved method for ride-height control of an air suspension system, in which method the regeneration of the dryer is also performed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating an electronically controllable air suspension system for a motor vehicle is provided, said air suspension system comprising an air suspension device which has a multiplicity of air springs, wherein, by way of the air suspension device, a ride-height position of the motor vehicle can be changed through feeding and removal of compressed air, and a compressed-air supply unit which has a compressor, which is driven by an electric motor, and has a dryer, wherein the compressed-air supply unit provides the compressed air by sucking in ambient air, wherein a ride-height control function, in the case of which the ride-height position of the motor vehicle is firstly raised to a first ride-height position through feeding of compressed air into the air suspension device and is subsequently lowered to a second ride-height position through removal of compressed air from the air suspension device, can be performed, wherein, for a first condition, it is checked whether a determined air quantity ratio is less than a first predetermined air quantity limit value, or, for a second condition, it is checked whether a saturation level of the dryer is greater than a saturation limit value, and if the first or the second condition is satisfied, then the ride-height control function is activated.

The ride-height level function by means of which the vehicle body, in relation to the road surface or in relation to the vehicle chassis with air suspension, is firstly raised to a ride-height position above the actual target ride-height position and is subsequently lowered to the target ride-height position is only performed if at least one condition is satisfied. That is to say, for the stated ride-height control function, the first ride-height position is a target ride-height position and the second ride-height position is a ride-height position above the target ride-height position.

Said ride-height control function has the consequence that the compressor feeds more air into the air springs than would actually be necessary for reaching the target ride-height position. Owing to this additionally sucked-in compressed air, during the directly subsequent lowering to the target ride-height position, the dryer is flowed through in a counterflow configuration by this additionally sucked-in compressed air and in the process is regenerated.

If neither of the conditions is satisfied, then changes in height of the vehicle body are performed without the ride-height control function with exceedance of the target ride-height position. In this way, the compressor is not operated for an excessively long time because, for the normal changes in height, no additional compressed air is required. Without the conditions being queried, the air suspension system would be adjusted beyond the actual target ride-height position each time the height is changed and consequently unnecessarily load the compressor. The targeted performance of the ride-height control function with exceedance of the target ride-height position results in the number of additional, unnecessary ride-height controls to an excessively high ride-height position being greatly reduced or even being avoided completely. This protects the compressor because it is not stressed unnecessarily, whereby its service life is lengthened.

The filling of the air suspension device for raising the vehicle to the first ride-height position can be realized as follows. The ride-height position of the motor vehicle may be raised to the first ride-height position through feeding of compressed air by means of the compressed-air supply device into the air suspension device. For example, the air suspension system comprises a pressure accumulator. If the air suspension system has a pressure accumulator, then the ride-height position of the motor vehicle may also be raised to the first ride-height position through feeding of compressed air into the air suspension device from the pressure accumulator.

For regeneration of the dryer, it may be the case that the ride-height position of the motor vehicle is lowered to the second ride-height position through removal of compressed air from the air suspension device into the surroundings through the dryer. The compressed air flowing out absorbs water/moisture from the dryer in the process and carries it out of the system into the surroundings. In this way, the saturation of the dryer is reduced.

A ride-height position of the motor vehicle is to be understood as at least in one meaning the height of the vehicle body in relation to the road surface. This height or level can be changed by operating the air springs of the air suspension system. For this purpose, compressed air is fed into the air springs or is let out therefrom. A change in the air quantity in the air springs results in a change in the position of the vehicle body in relation to the vehicle axles.

As a first condition, the fed and discharged air quantities are compared. It is checked whether the quotient of the discharge air quantity and the feeding air quantity is less than the first predetermined air quantity limit value. If this is the case, the first condition is said to be satisfied. A suitable predetermined air quantity limit value may be set specifically for each type of dryer.

For the second condition, the saturation level of the dryer is compared with the predetermined saturation limit value. It is checked whether the saturation level is greater than the saturation limit value. If this is the case, the second condition is said to be satisfied. Saturation level is to be understood as meaning the quantity of water bound in the desiccant. In the case of maximum saturation, the quantity of water is so large that the desiccant cannot absorb any more water. There is a risk of water breaking through into the air suspension system. The predetermined saturation limit value is also set specifically according to each type of dryer.

The air quantity ratio may be determined from a discharge air quantity relative to a feeding air quantity. For this purpose, the discharge air quantity may be determined from the quantity of compressed air which has been discharged into the surroundings through the dryer. The feeding air quantity may be determined from the quantity of compressed air which has been fed into the air suspension system from the surroundings by means of the compressed-air supply device.

According to one embodiment, the saturation level of the dryer is calculated from a quantity of water fed into the air suspension system minus a quantity of water discharged from the air suspension system. For example, the fed water quantity is determined at least on the basis of a measured ambient temperature or of a measured ambient air humidity.

In a further embodiment, for the ride-height control function, the ride-height position of the motor vehicle is determined by a height sensor.

According to a further embodiment, for a third condition, it is checked whether the determined air quantity ratio is greater than a second predetermined air quantity limit value, and, if the third condition is satisfied, then the ride-height control function is deactivated. It is expedient to deactivate the ride-height control function again only when the dryer is in a non-critical range.

The air suspension system can be controlled electronically by a control unit which serves for actuation of the setting device, of the discharge valves and of the compressor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
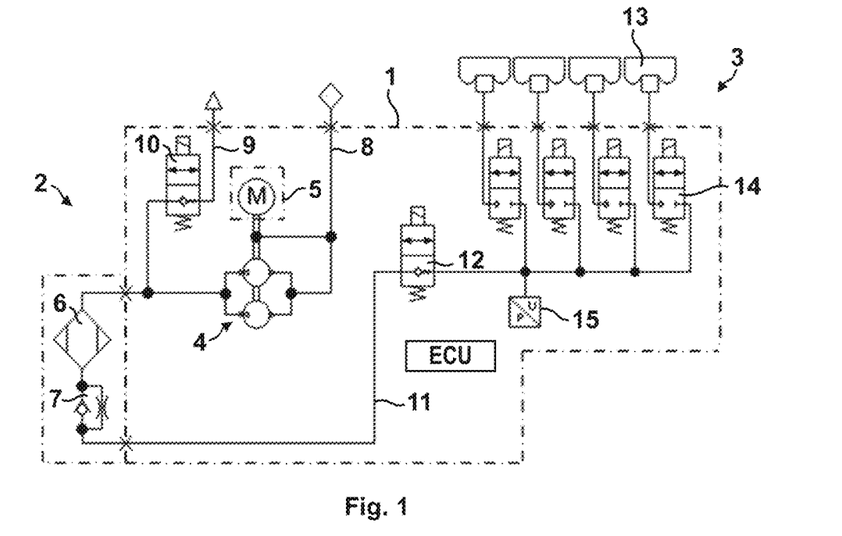
FIG. 1 shows a pneumatic circuit diagram of an air suspension system.

FIG. 1 shows a pneumatic circuit diagram of an electronically controllable air suspension system 1 of a motor vehicle that operates in the open air supply mode. That is to say, for changing of a ride-height position of the motor vehicle by means of the air suspension system 1, for each ride-height control, air is sucked in from the surroundings or compressed air is discharged into the surroundings from the air suspension system 1.

The air suspension system 1 comprises for this purpose a compressed-air supply unit 2 and an air suspension device 3, which are connected via a connecting line 11 to a switching valve 12. The air suspension system 1 may additionally include a pressure accumulator (not shown). This would branch off by way of a compressed-air path between the air suspension device 3 and the switching valve 12. Here, it is then also expedient for the switching valve 12 to be replaced by a switching valve device with four 2/2-way valves.

The air suspension device 3 comprises four air springs 13, which are each assigned to a wheel of the motor vehicle, and air spring valves 14, which are arranged before said air springs. For simplicity, only one air spring and only one air spring valve have been provided with the corresponding reference sign. Opening of the air spring valves 14 allows compressed air to flow over into the respective air spring 13 or to flow out of the latter. Furthermore, provision is made of a pressure sensor 15 at the connecting line 11, between the switching valve 12 and the air spring valves 14. The air pressure in the air springs 13 is determined by the pressure sensor 15.

The compressed-air supply unit 2 comprises a compressor 4 which is driven by an electric motor 5. In the example shown, the compressor 4 is in the form of a double-piston compressor. The compressed-air supply unit 2 furthermore comprises a dryer 6 and a throttle/check valve device 7. In order for compressed air to be fed into the air suspension system 1, provision is made of an inlet path 8 which leads to the entry side of the compressor 4. Compressed air is discharged into the atmosphere from the air suspension system via a discharge path 9 with a discharge valve 10. The discharge path 9 branches off from a compressed-air path between the compressor 4 and the dryer 6 and leads out into the surroundings of the compressed-air supply unit 2.

A control unit (ECU) is also part of the air suspension system 1 and is provided for actuating the different components of the air suspension system 1. The ride-height control function for changing the ride-height position of the motor vehicle is performed by the control unit. Mainly, the compressor 4 and the multiplicity of electromagnetic switching valves are actuated using the control unit. Through operation of the compressor 4 and opening of particular valves, compressed air can be fed into a particular air spring 13 or also discharged from the latter again. These processes lead to the change of the ride-height position at each corner, or at each wheel, of the motor vehicle.

In order, for example, for compressed air to be provided for the air suspension system 1, the compressor 4 sucks in air from the surroundings via the inlet path 8, compresses said air and feeds it to the air suspension device 3 via the dryer 6 and the connecting line 11 (with the switching valve 12 open). This is referred to as compression process.

During the compression process, the water vapor contained in the air is adsorbed by the dryer 6. This is realized by way of an adsorbent stored in the dryer 6, for example silica gel. At and above a certain quantity of water bound to the adsorbent, the dryer 6 is to be considered as being saturated. In the case of complete saturation, the dryer 6 cannot absorb any more water. There is then the risk that, during a further compression process, water breaks through into the air suspension device 3 from the dryer 6 and, for example, damages air spring valves 14. For this reason, the water contained in the dryer 6 has to be removed again. This is generally realized in that compressed air is conducted through the dryer 6 in the counterflow direction (that is to say counter to the compression direction) and escapes via the discharge path 9 into the atmosphere/surroundings. The compressed air escapes into the surroundings from the air springs 13 (with the air spring valves 14 open) and (with the switching valve 12 open) via the connecting line 11, the throttle/check valve device 7, the dryer 6 and the discharge path 9 (with the discharge valve 10 open). Such a discharge process is also referred to as regeneration process. For such a regeneration process, the dry compressed air is used by the air suspension system 3. Use may be made of the compressed air from the pressure accumulator too, if present. Here, the compressed air flowing through the dryer 6 absorbs the water from the adsorbent and releases this as water vapor to the surroundings. In this way, the saturation level of the dryer 6 is reduced.

Figure 2:
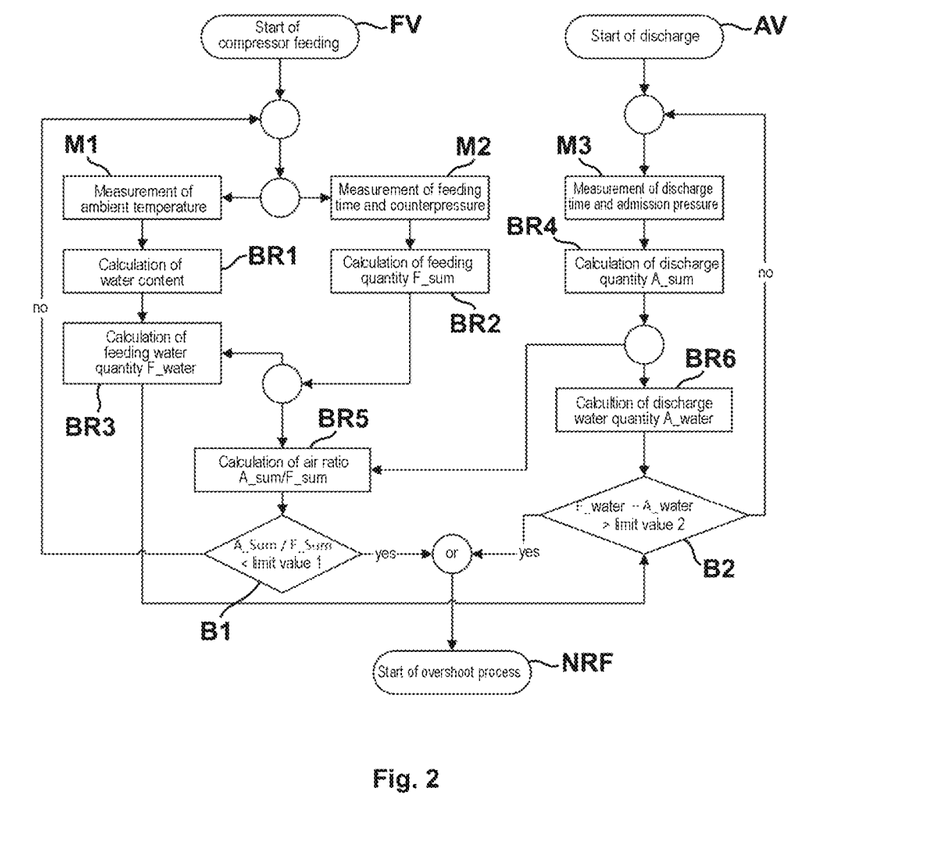
FIG. 2 shows a flow diagram for the starting of a ride-height control function with exceedance of a target ride-height position.

The flow diagram in FIG. 2 shows an exemplary method by means of which a ride-height control function NRF, which is advantageous for regeneration of the dryer, is activated only if particular conditions are satisfied.

Said ride-height control function, also referred to as "overshoot", comprises a ride-height control of the vehicle body in two stages. If a request to raise the current ride-height position of the motor vehicle to a target ride-height position is present, then the ride-height position is raised beyond the target ride-height position by a certain measure of height (for example 10 mm) and is subsequently lowered to the target ride-height position. The target ride-height position is deliberately exceeded. During the raising to the target ride-height position or to a ride-height position above the target ride-height position, the compressor has to be operated until compressed air, for the excessively high ride-height position, has been fed into all the air springs to a sufficient extent. Raising of the motor vehicle to an excessively high ride-height position has the consequence however that more compressed air is transferred into the air springs than would have been necessary for raising to the target ride-height position. Subsequent lowering to the target ride-height position is associated with a discharge of compressed air from the air springs. Said compressed air flows through the dryer and regenerates the latter. Consequently, the ride-height control function NRF, with exceedance of the target ride-height position, has the advantage of regeneration of the dryer.

Therefore, more water is removed during a discharge process than is absorbed by the dryer during a feeding process. That is to say, the same quantity of compressed air absorbs more water during discharge than the same quantity of compressed air releases to the dryer during feeding. This is firstly due to the design of the dryer cartridge and the particular passing of compressed air through the dryer cartridge. It is furthermore however also due to the fact that the compressed air is expanded by means of the throttle and passes at a reduced speed through the dryer. In this way, the same quantity of compressed air can absorb, and release to the surroundings, more water vapor. That is to say the quantity of water vapor which was introduced into the dryer by way of the compressed air, sucked in through the compressor, for the difference in height from the target ride-height position to the excessively high ride-height position is smaller than the quantity of water vapor which is removed by way of the compressed air during lowering from the excessively high ride-height position to the target ride-height position. In this way, the ride-height control function effects the regeneration of the dryer. The saturation level of the dryer consequently partially drops during each ride-height control with exceedance of the target ride-height position.

What comes into consideration as a request for ride-height control is for example a change in loading in the case of which the motor vehicle, after being loaded by passengers or luggage, has to be raised to a normal position again.

Since, with each ride-height control, an exceedance of the target ride-height position requires a longer running time of the compressor than actually necessary, two conditions are set in the example. The ride-height control function NRF, with exceedance of the target ride-height position, is to be activated only if one of the two conditions is satisfied. This is intended to prevent the target ride-height position being exceeded each time a ride-height control is realized, so as not to unnecessarily load the compressor. The ride-height control function NRF is to be performed only if the quantity of water contained in the dryer makes it necessary, so as then to reduce the water content in the dryer.

For a first condition B1, it is checked whether an air quantity ratio falls below an air quantity limit value. For a second condition B2, it is checked whether a saturation level of the dryer exceeds a saturation limit value. The measurement values, and calculations, required for the checks are determined during each feeding process FV and during each discharge process AV.

The feeding process FV begins with the starting of the compressor feeding. What is meant by this is the compression process described on the basis of FIG. 1. During such a feeding process FV, the ambient temperature is determined in a first measuring process M1. This is preferably realized by way of a vehicle temperature sensor. In a first calculation BR1, the water vapor in the ambient air is determined from the determined ambient temperature. Here, the water content in the ambient air is always determined on the assumption that the air sucked in has a maximum possible content of water vapor at a particular temperature. There are tables which show the maximum proportion of water in the air at each temperature. This assumption serves the safety of determining the quantity of water in the dryer under the worst conditions.

In a second measuring process M2, the feeding time of the compressor is detected and, by way of the pressure sensor, the counterpressure at the compressor is determined. What is meant by counterpressure is the pressure at the compressor exit, against which the compressor has to work in order to feed the compressed air. These values can be used to determine a feeding quantity F_sum in a second calculation BR2. Consequently, the quantity of compressed air fed by the compressor that was required for raising the motor vehicle during the individual compression processes is determined over multiple feeding processes. Thus, the individual quantities of compressed air are added over multiple compression or feeding proceeses to form the feeding air quantity F_sum.

In a third calculation BR3, the determined water vapor content of the air sucked in in the first calculation BR1 and the calculated feeding air quantity F_sum from the second calculation BR2 are used to determine the quantity of water fed. Here, the quantity of water fed into the system is calculated by multiplying the feeding air quantity by the water vapor content of the air sucked in. It is thus possible for the water content in the dryer to be estimated from the ambient temperature and the feeding air quantity F_sum.

The water content in the dryer, however, is reduced by way of discharge of compressed air. For this reason, measurements and calculations are also performed upon the starting of a discharge process AV. In this regard, during each discharge process AV, the discharge time is detected, and the admission pressure at the compressor entry is measured by the pressure sensor, in a third measuring process M3. These measurement values can be used to determine the discharge quantity A_sum in a fourth calculation BR4. What is meant by this is the quantity of compressed air which was discharged into the surroundings from the air springs through the dryer. In this case, too, the discharge air quantity A_sum is added up over one or more discharge processes AV.

In a fifth calculation BR5, the discharge air quantity A_sum is then compared with the feeding air quantity F_sum. That is to say, a ratio of the discharged air quantity to the fed air quantity is formed. A quotient of the discharge air quantity A_sum and the feeding air quantity F_sum is calculated. Said quotient determines the quantity of compressed air still present in the air suspension system after a discharge process. This is at the same time an indirect estimation of the quantity of water bound in the dryer.

The discharge air quantity A_sum is however also used in a sixth calculation BR6 to determine the discharged water quantity A_water, which was entrained and removed when the dryer was flowed through. In the determination of the water quantity A_water discharged from the system, it is assumed that, during each discharge, the dry compressed air absorbs water vapor to an extent of almost 100%.

After these calculations have been performed by the control unit, the checking of the conditions for the ride-height control function NRF can be begun. For the first condition B1, it is checked whether the ratio of discharge air quantity A_sum to feeding air quantity F_sum, or the resulting quotient, is less than a predetermined first limit value. As first limit value, use is made of an air quantity limit value, that is to say the proportion of the discharged air quantity relative to the fed air quantity, of 50% to 80%. If the quotient is for example 0.5, only half of the entire feeding air quantity has been discharged. In this case, a high water content in the dryer is to be assumed. Such a ratio can be obtained if, owing to leakage, more compressed is fed into the system than has been discharged therefrom. Any loss of compressed air through leakage does not contribute to the regeneration of the dryer. This then makes the above-described ride-height control function NRF, which leads to a regeneration of the dryer, necessary. Thus, only if the first condition B1 is satisfied and a request for ride-height control of the motor vehicle is present is the ride-height control function NRF, with exceedance of the target ride-height position, performed.

The possible water content in the dryer, however, can also be determined in another way. The fed water quantity F_water from the third calculation BR3 and the discharged water quantity A_water from the fifth calculation BR5 are used to form the basis of the second condition B2. In this regard, in the second condition B2, it is checked whether a difference of the fed water quantity F_water minus the discharged water quantity A_water is greater than a second limit value. The difference of the fed water quantity F_water minus the discharged water quantity A_water is also referred to as saturation level of the dryer. The saturation level indicates the water content, or quantity of water, contained in the dryer and is indicated in $g/m^3$. If the saturation level exceeds a saturation limit value, then there is the risk of an oversaturated dryer. For this reason, in the event of an exceedance of a predetermined saturation limit value in a range of 2 g to 3 g, the ride-height control function NRF, with exceedance of the target ride-height position, is to be performed. In this way, in particular in the event of a critical saturation, provision is to be made for a direction regeneration of the dryer. As long as the saturation level is above the saturation limit value, exceedance of the target ride-height position is performed during each ride-height control, so that, through the discharge of compressed air, the dryer is always regenerated. If the saturation level is then below the saturation limit value again, continuous ride-height control with exceedance of the target ride-height position is no longer required.

Therefore, if neither the first condition B1 nor the second condition B2 is satisfied, there is no need for the ride-height control function NRF, with exceedance of the target ride-height position. If a ride-height control or raising of the motor vehicle is requested, a regular ride-height control, in the case of which the sought target ride-height position is reached directly and without exceedance, may be performed. This shortens the feeding time and protects the compressor. If the first condition B1 is not satisfied, the loop starts again with the first and second measuring processes M1, M2. If the second condition B2 is not satisfied, the loop starts with the third measuring process M3.

Figure 3:
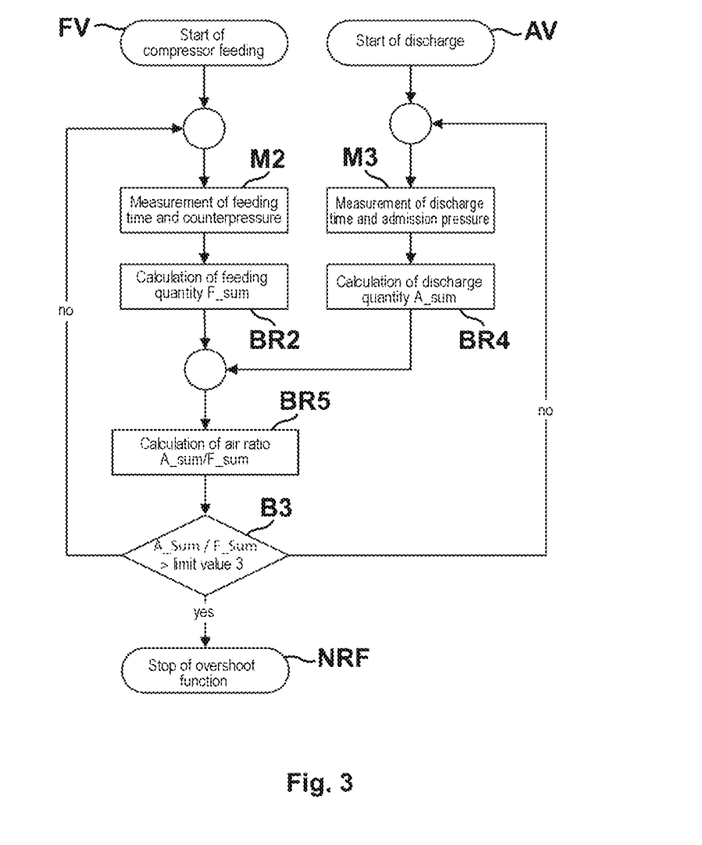
FIG. 3 shows a flow diagram for the stopping of this ride-height control function.

If the ride-height control function NRF has been activated, this should also be deactivated again at some point. In this regard, FIG. 3 shows a flow diagram which, upon a third condition B3 being satisfied, cancels the ride-height control function NRF again. This is based on the above-described measurement values and calculations in relation to the air quantities. During the feeding process FV, as already described, the feeding time is detected, and the counterpressure is measured, in the second measuring process M2. These are used to obtain the feeding air quantity F_sum in the second calculation BR2. During the discharge process AV, as already described, the discharge time is detected, and the admission pressure is measured, in the third measuring process M3. These are used to determine the discharge air quantity A_sum in the fourth calculation BR4. In the fifth calculation BR5, the ratio of the discharge air quantity to the feeding air quantity is determined. Then, for the third condition B3, it is checked whether the quotient of discharge air quantity and feeding air quantity is greater than a third limit value. Said third limit value is also an air quantity limit value, but is different from the first limit value of the first condition B1. The air quantity limit value of the third condition B3 lies in a range of 70% to 100%. If the calculated air quantity ratio exceeds said limit value, the ride-height control function with exceedance of the target ride-height position may be deactivated. If the third condition B3 is not satisfied, the second and third measuring processes M2, M3 are begun again in the control unit.

Figure 4:
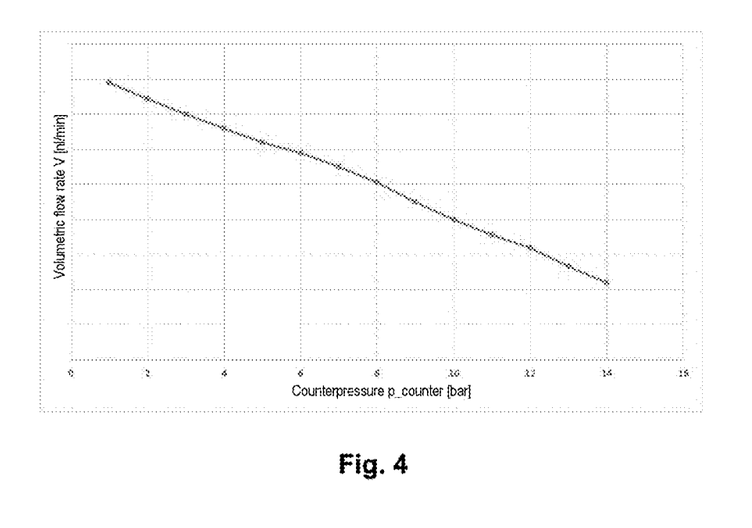
FIG. 4 shows an exemplary characteristic curve for a volumetric flow rate during feeding.

FIG. 4 shows in a diagram compressor feeding power or volumetric flow rate in nl/min versus counterpressure in bar. The value table here is stored in the control unit, for the feeding of air from the surroundings. The counterpressure can be determined via the pressure sensor. Then, the control unit can deduce a fed air quantity from this diagram for each time segment, and can determine the entire feeding air quantity F_sum over time or over multiple feeding processes.

Figure 5:
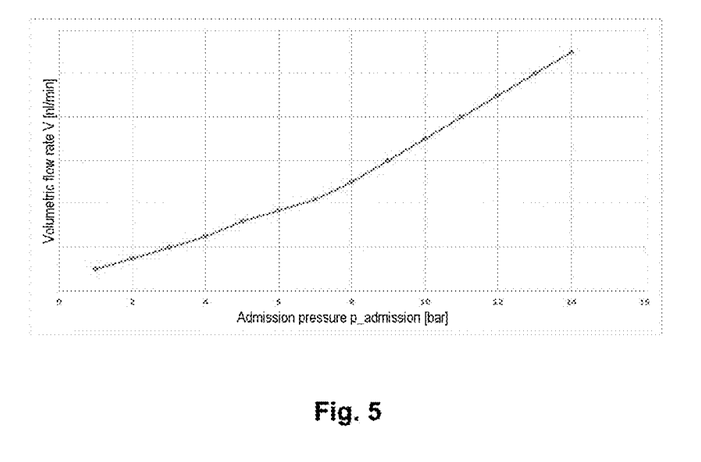
FIG. 5 shows an exemplary characteristic curve for a volumetric flow rate during discharge.

A discharge characteristic curve is shown in FIG. 5. Volumetric flow rate during discharge in nl/min is plotted against admission pressure in bar. The discharge of compressed air from the air springs takes place via open air spring valves, through the dryer and via the discharge line (with open discharge valve). The quantity of compressed air flowing out here is limited by the throttle in the throttle/check valve device. For the throttle, a characteristic curve for volumetric flow rate versus admission pressure can likewise be stored in the control unit. The admission pressure is determined by the pressure sensor, and is used by the control unit to determine a discharged air quantity for each time segment. The entire discharge air quantity A_sum is then calculated over time or over multiple discharge processes.

Figure 6:
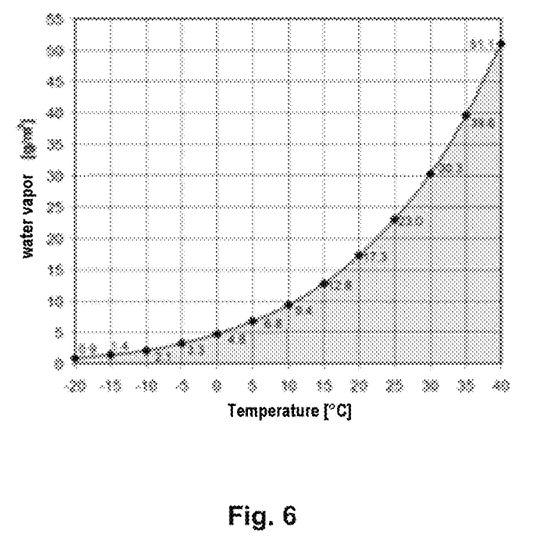
FIG. 6 shows a saturation curve for water vapor in air.

For determining the quantity of water fed, use is made of the saturation curve from FIG. 6. This indicates water vapor contained in air in g/m³ versus temperature in ° C. This saturation quantity of water vapor in air is stored as a characteristic curve in the control unit. The temperature of the ambient air sucked in is detected via a vehicle temperature sensor. The maximum water content in the air at a particular temperature can thus be read. The quantity of water fed into the air suspension system is calculated from the feeding air quantity F_sum multiplied by the water vapor content of the air sucked in from the surroundings. Here, as the worst case, a 100% presence of air moisture is always assumed, so that the dryer is considered to be saturated under the worst possible conditions. During vehicle operation, the air humidity will normally be below 100%, and so the actual quantity of water in the dryer is less than that calculated. For example, the air humidity of the ambient air is measured directly using an air humidity sensor. The measurement values thereof lead to a more accurate determination of the quantity of water contained in the dryer.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. A method for operating an electronically controllable air suspension system for a motor vehicle, comprising:
   raising a ride-height position to a first ride-height position through feeding of compressed air into the air suspension device;
   lowering the ride-height position to a second ride-height position through removal of compressed air from the air suspension device subsequent to the raising to the first ride-height;
   determining an air quantity ratio based at least partially on an ambient air quality;
   checking a first condition whether the determined air quantity ratio is less than a first predetermined air quantity limit value;
   determining a saturation level of a dryer;
   checking a second condition whether the saturation level of the dryer is greater than a saturation limit value; and
   activating a ride-height control function of a control unit when at least one of the first and the second condition is satisfied.

2. The method as claimed in claim 1, wherein the determined air quantity ratio is based on a discharge air quantity relative to a feeding air quantity.

3. The method as claimed in claim 2, further comprising determining the discharge air quantity from the quantity of compressed air which has been discharged into the surroundings through the dryer.

4. The method as claimed in claim 2, further comprising determining the feeding air quantity from the quantity of compressed air which has been fed into the air suspensions system from the surroundings by the compressed-air supply device.

5. The method as claimed in claim 1, further comprising calculating the saturation level of the dryer from a quantity of water fed into the air suspension system minus a quantity of water discharged from the air suspension system.

6. The method as claimed in claim 5, further comprising determining the fed water quantity at least partially on the basis of one of: a measured ambient temperature and of a measured ambient air humidity.

7. The method as claimed in claim 1, further comprising determining the ride-height position of the motor vehicle with a height sensor.

8. The method as claimed in claim 1, further comprising checking a third condition of whether the determined air quantity ratio is greater than a second predetermined air quantity limit value, and deactivating the ride-height control function when the third condition is satisfied.

9. An air suspension system for a motor vehicle comprising: an air suspension device by way of which a ride-height position of the motor vehicle can be changed through feeding and removal of compressed air into a plurality of air springs; a compressed-air supply unit which has a compressor driven by an electric motor,
   a dryer, wherein the compressed-air supply unit provides the compressed air by sucking in ambient air; and
   a control unit for performing a ride-height control function with instruction for:
      raising the ride-height position to a first ride-height position through feeding of compressed air into the air suspension device;
      lowering the ride-height position to a second ride-height position through removal of compressed air from the air suspension device subsequent to the raising to the first ride-height;
      determining an air quantity ratio based at least partially on an ambient air quality;
      checking a first condition whether the determined air quantity ratio is less than a first predetermined air quantity limit value;
      determining a saturation level of the dryer; checking a second condition whether the saturation
   level of the dryer is greater than a saturation limit value, and
      activating the ride-height control function when at least one of the first and the second condition is satisfied.

10. The air suspension system as claimed in claim 9, wherein the air quantity ratio is a discharge air quantity relative to a feeding air quantity.

11. The air suspension system as claimed in claim 10, wherein the discharge air quantity is based upon the quantity of compressed air which has been discharged into the surroundings through the dryer.

12. The air suspension system as claimed in claim 10, wherein the feeding air quantity is based on the quantity of compressed air which has been fed into the air suspension system from the surroundings by the compressed-air supply device.

13. The air suspension system as claimed in claim 9, wherein the saturation level of the dryer is calculated from a quantity of water fed into the air suspension system minus a quantity of water discharged from the air suspension system.

14. The air suspension system as claimed in claim 13, wherein the fed water quantity is determined at least partially on the basis of one of: a measured ambient temperature and a measured ambient air humidity.

15. The air suspension system as claimed in claim 9, further comprising a height sensor to determine the ride-height position of the motor vehicle.

16. The air suspension system as claimed in claim 9, wherein the control unit further comprises instruction for checking a third condition of whether the determined air quantity ratio is greater than a second predetermined air quantity limit value, and deactivating the ride-height control function when the third condition is satisfied.

* * * * *